(12) United States Patent
Awdeh (10) Patent No.: US 7,800,820 B2
(45) Date of Patent: Sep. 21, 2010

(54) MICROSCOPE VIEWING DEVICE

(76) Inventor: Richard Awdeh, 2211 Hillsborough Rd., Apt. 4081, Durham, NC (US) 27705

(*) Notice: Subject to any disclaimer, the term of this patent is extended or adjusted under 35 U.S.C. 154(b) by 0 days.

(21) Appl. No.: 11/772,393

(22) Filed: Jul. 2, 2007

(65) Prior Publication Data

US 2008/0123183 A1    May 29, 2008

Related U.S. Application Data

(60) Provisional application No. 60/817,478, filed on Jun. 30, 2006.

(51) Int. Cl.
*G02B 21/00* (2006.01)

(52) U.S. Cl. .................................. 359/368; 359/387
(58) Field of Classification Search ................ 359/368, 359/385, 387
See application file for complete search history.

(56) References Cited

U.S. PATENT DOCUMENTS

| 4,202,037 | A | 5/1980 | Glaser et al. |
| 5,135,299 | A | 8/1992 | Kitajima et al. |
| 5,526,812 | A | 6/1996 | Dumoulin et al. |
| 6,005,710 | A | 12/1999 | Pensel et al. |
| 6,081,371 | A | 6/2000 | Shioda et al. |
| 6,678,090 | B2 | 1/2004 | Spink |
| 7,001,018 | B1 | 2/2006 | Martin |
| 2003/0181803 | A1 | 9/2003 | Sander |
| 2005/0046953 | A1* | 3/2005 | Repetto et al. ............ 359/630 |
| 2005/0277913 | A1 | 12/2005 | McCary |
| 2006/0048286 | A1* | 3/2006 | Donato ..................... 2/422 |
| 2006/0250684 | A1 | 11/2006 | Sander |

* cited by examiner

*Primary Examiner*—Joshua L Pritchett
(74) *Attorney, Agent, or Firm*—Cermak Nakajima LLP; Adam J. Cermak (57) ABSTRACT

A microscope, e.g., a surgical microscope, includes an image generation device in the light path or light paths of the microscope. Images based on real-time or static data concerning the object in view, e.g., a patient's MRI data and/or parameters of one or more surgical instruments being used to operate on the patient, are projected into the microscope's light path so the surgeon does not need to look away from the surgical field and does not require other personnel to read outloud the settings and data from the machines being used in the surgery.

26 Claims, 7 Drawing Sheets

MICROSCOPE VIEWING DEVICE

This application claims priority under 35 U.S.C. §119 to U.S. Provisional patent application No. 60/817,478, filed 30 Jun. 2006, the entirety of which is incorporated by reference herein.

BACKGROUND

1. Field of Endeavor

The present invention relates to devices and systems useful as surgical microscopes.

2. Brief Description of the Related Art

Microscopes, including surgical microscopes used in the operating room in human and animal surgery, and laboratory microscopes, offer the user a magnified, stereoscopic view of the selected field. While these microscopes are successful in providing a magnified view to the user, they do not allow for the simultaneous view of data, including both real-time streaming data and non-real time data, into the viewer's field (see FIG. 1: the actual microscope view of the surgical field 12, and the 'black space' 10 surrounding the microscopic view).

Figure 1:
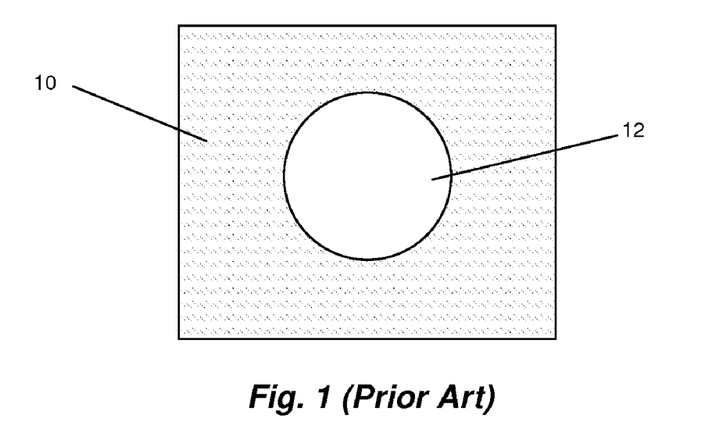
FIG. 1 schematically illustrates a view provided by a prior art surgical microscope.

Most microscopes include two eyepieces, one for the right eye and one for the left, and both are focused on the same field (usually with separate light paths, thus creating a stereoscopic, three-dimensional view). The final image seen by the user of the microscope is fused from the right and left eyepieces to form a single view which is a circle 12, which is referred to herein as the "microscope field". This circle is surrounded by an area of "black space" 10 which is included in the final image seen by the user of a microscope, the combination of which creates the "viewer's field". This single microscope field and black space is derived from the fusion of two images (one seen by the right eye and one by the left eye).

The black space 10 is not currently utilized in microscope designs. In the application of surgical microscopes, the utilization of this space in a novel way would allow for real-time intra-operative feedback (including real time and non-real time data, as described in further detail below) to appear in the black space and be viewed by the surgeon in real-time during surgery, but no such devices are currently available.

In the specialty of ophthalmic surgery, the surgeon currently operates by looking through the eyepieces of a surgical microscope, thus viewing the surgical field (in this case, a patient's eye) in higher magnification. This surgical field equates to the microscope field as described above and is surrounded by a black space, ultimately creating the viewer's field as described above. However, the use of microscopes has historically created a problem for surgeons as their access to, and view of, data while operating is limited to whatever image appears in the viewer's field. In the aforementioned example of ophthalmic surgery, the devices used by the surgeon during surgery are inserted into the eye and connected to external machinery that drives the devices. Each of these devices has various parameters (e.g., vacuum power, cutting speed, aspiration, etc.) that are controlled by foot pedals operated by the surgeon's feet. Each of these parameters, which must be continuously monitored during the surgery, change in real time (i.e., in numerical values) and are currently displayed on one or more external displays, which is not in direct sight of the surgeon while he or she is looking through the microscope to operate.

As such, the current technology does not provide surgeons with real time access to parameters that are important to the surgery while they are looking through the surgical microscope. This leaves surgeons to rely on a nurse or other assistant to continually read the parameters from the external display device out loud to the surgeon. Further, under the current technology, the surgeon is unable to simultaneously view a magnetic resonance image (MRI), computed tomography image (CT), or any other image or piece of data from a patient's medical record, while he or she is looking through the microscope while operating. This prevents the surgeon from viewing essential data and from evaluating diagnostic studies while he or she is operating, creating a further limitation with the use of microscopes in surgery and elsewhere.

SUMMARY

According to a first aspect of the invention, a microscope comprises a stack of optical elements defining at least one lightpath, a viewing field, and a blackspace around the viewing field, and at least one image generation device positioned at least partially in the at least one lightpath and configured to project at least one image into at least one of a portion of the black space and a portion of the viewing field.

According to another aspect of the present invention, a microscope comprises a stack of optical elements defining at least one lightpath, and at least one image generation device positioned at least partially in the at least one lightpath and external to the stack, the at least one image generation device configured to project at least one image into the lightpath.

According to yet another aspect of the present invention, a method of forming an image to a user of a microscope comprises conducting light from an object along at least one lightpath through the microscope to define a viewing field and a blackspace around the viewing field, and simultaneously projecting at least one image into at least one of a portion of the black space and a portion of the viewing field.

Still other aspects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to exemplary embodiments of the apparatus and method, given only by way of example, and with reference to the accompanying drawings, in which.

DETAILED DESCRIPTION OF EXEMPLARY EMBODIMENTS

Referring to the drawing figures, like reference numerals designate identical or corresponding elements throughout the several figures.

In the context of this application, reference will be made to one or more lightpaths, which indicates the path that light follows from a source, e.g., an object being viewed by a microscope, towards an endpoint. For ease of reference, the term 'upstream' will refer to the direction along the lightpath toward the source, and the term 'downsteam' will refer to the opposite direction, i.e., along the lightpath away from the source.

In general terms, the invention in this application relates to the display of data, graphics, and video, both dynamic and static, inside any microscope such that the user can simultaneously view the microscopic field as well as monitor data parameters. Principles of the present invention can be applied in the setting of any microscope, including surgical microscopes and laboratory microscopes. Through the utilization of the black space, as well as the viewer's field, by embedding image creation devices into the microscope that displays a variety of images, a user of the microscope can better concentrate on the field of view, e.g., the surgical field, without having to look away from the microscope.

Figure 4:
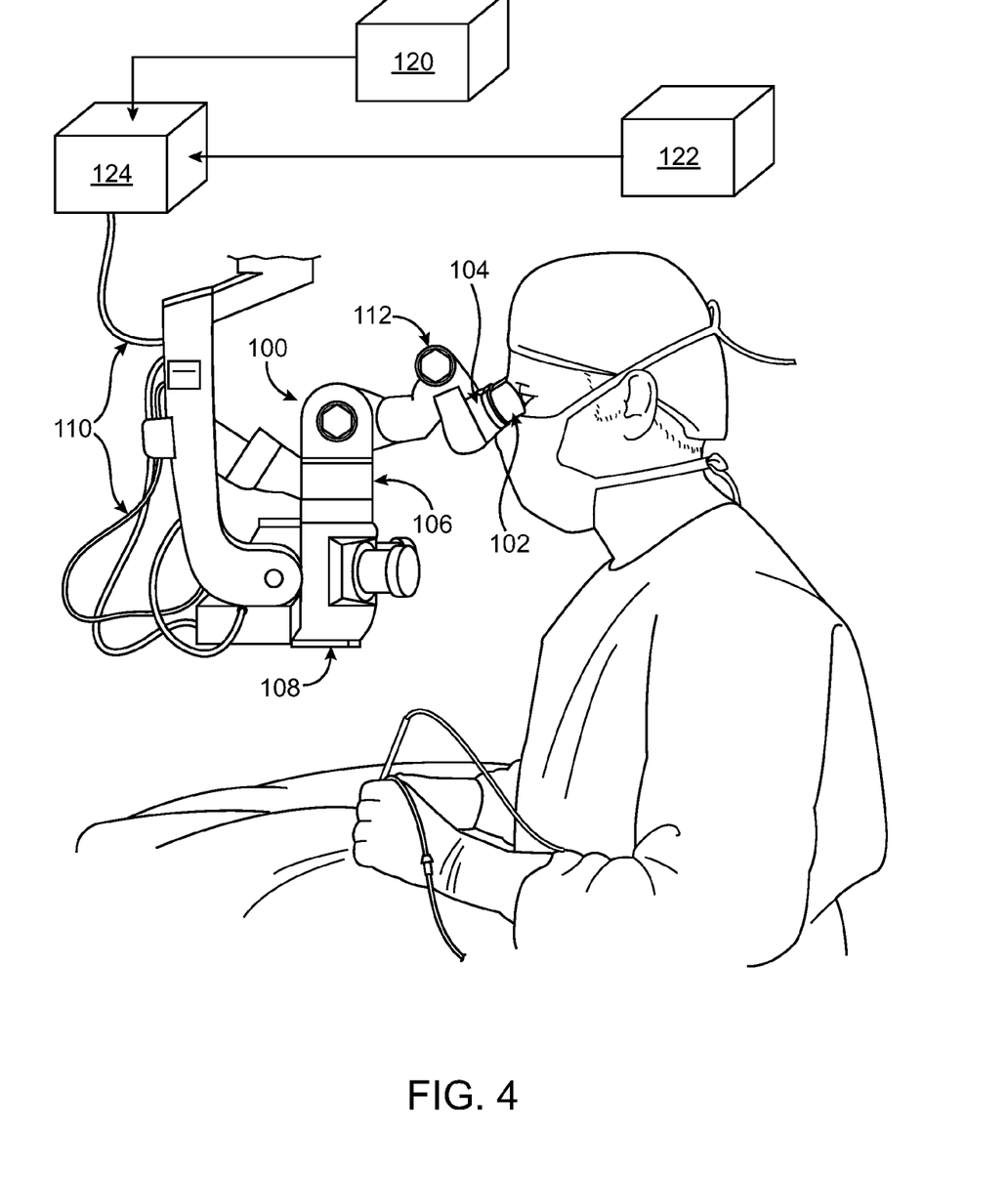
FIG. 4 illustrates a surgical microscope in use by a surgeon, indicating some of numerous locations in the microscope in which display technologies of the present invention can be incorporated.

By embedding image generation or image projection (display) technology into the microscope, devices adhering to principles of the present invention can enable the user of the microscope, e.g., a surgeon, to continuously monitor data, e.g., patient data, including real-time operative parameters streamed from surgical instruments including those used in vitreo-retinal surgery (including by not limited to vitrector, vitreous-cutting scissors, light pipes, injectors) and those used in cataract surgery (including but not limited to phacoemulsification power, ultrasound power, vacuum power, aspiration power and irrigation power) as described herein, as well as other sets of patient data (including imaging studies such as MRI, CT, Optical Coherence Tomography (OCT), Flourescien Angiography (FA) and medical records) in the black space 10 and/or the microscope view of the specimen 12. According to particularly preferred and advantageous embodiments, embedding organic light emitting diode (OLED) displays (or any other display material including light emitting diodes (LEDs), liquid crystal displays (LCDs), active and passive matrix displays and all types of OLED devices, including transparent (top- emitting) OLEDs, foldable OLEDs, and any organic electroluminescent display) (individually and collectively referred to herein as a "display") into a microscope such that the image or images generated by the display device appears in the black space 10 and/or the surgical field view 12, directly at the eyepieces of the microscope or in the microscope stack (including any portion along the tube, as illustrated in FIG. 4 as discussed below), the user, e.g., surgeon can view a live feed of data, as well as other data from multiple sources, while operating on a patient.

By way of example, the ability of a surgeon to monitor device parameters in real time while operating on a patient could revolutionize ophthalmic (and other subspecialty) surgeries. External feeds of data to a microscope of the present invention could include those from surgical instruments, video feeds, MRI, CT, x-ray feeds, and, in the area of ophthalmic surgery, Optical Coherence Tomography (OCT), Flourescein Angiography (FA), and other imaging modalities of the eye. Microscopes embodying principles of the present invention can allow the user to constantly monitor and record external parameters while examining and manipulating a specimen in the microscope field. Particularly advantageously, such a microscope can provide a surgeon with real-time, intra-operative feedback during surgeries.

Figure 2:
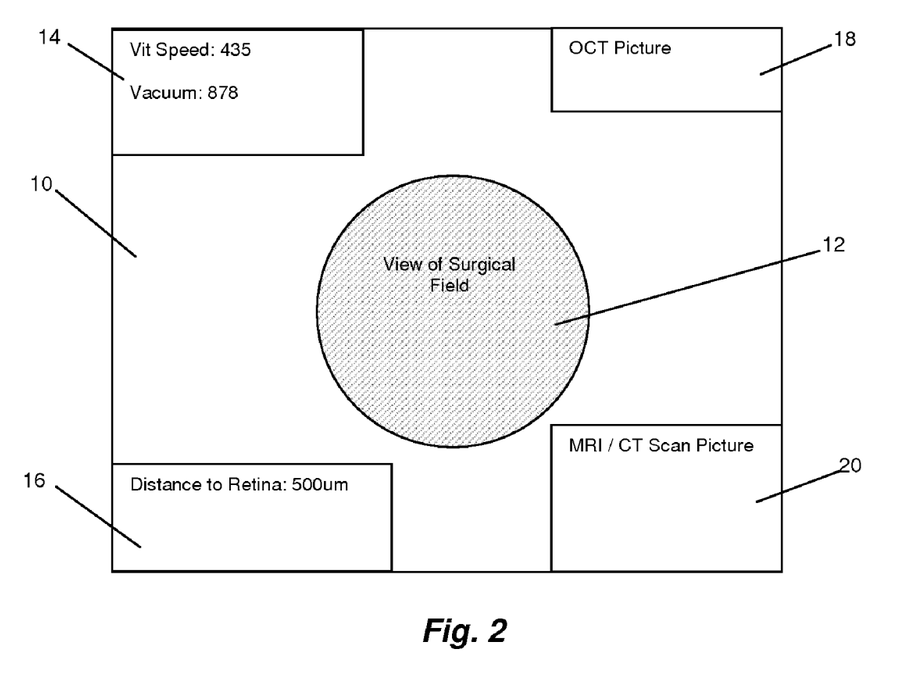
FIG. 2 schematically illustrates a view provided by a surgical microscope in accordance with an exemplary embodiment of the present invention.

Turning now back to the drawing figures, FIG. 2 schematically illustrates the viewer's field generated by one embodiment of a microscope of the present invention. Because the invention is not limited to the details of any particular microscope, and because the construction and components of microscopes, including surgical microscopes, is well known to the person of ordinary skill, details of the construction of a microscope will not be provided herein so as to not obscure the invention. Similarly, details of devices from which data is provided to a microscope of the present invention, e.g., surgical instruments, video cameras, MRI, CT, and the like, are not included herein, with the understanding that such commonly commercially available machines include data outputs for external display of the data generated by the machine. Likewise, because OLEDs, TOLEDs, and the like are commonly commercially available and well understood by those of ordinary skill in the art, details of their construction have been excluded herein for brevity's sake.

In addition to the view 12 of the, e.g., surgical field, and the black space 10, provided by the optical elements of the microscope, one or more data images 14, 16, 18, 20 are produced in the view provided to the user, thus permitting the user to maintain concentration on the object(s) on which the microscope is trained. By way of non-limiting example, these images can include one or more of the vacuum pressure, vit speed, distance to the retina, and various still or moving images, such as an OCT picture, MRI image, CT scan image, and the images representative of data from the other sources described herein. The present invention is not limited to a particular shape of the one or more data display areas; thus, while rectangular-shaped areas have been illustrated, any shape, including those with and without borders, are within the scope of the present invention. Further optionally, the image display can be projected into the blackspace 10, superimposed onto the microscope field 12, or both.

With reference to FIG. 4, the display device or devices can be positioned in any portion of the microscope 100 through which the light from the surgical field travels downstream to the user's (surgeon's) eyes, from directly in the eyepiece housing or mount 104 around the oculars 102 of the microscope to the end 108 of the microscope closest to the object being viewed. Several non-limiting, exemplary embodiments are discussed with reference to FIGS. 3 and 5-16.

An environment in which a microscope 100 of the present invention is advantageously used is generally illustrated in FIG. 4, and includes one or more instruments, monitors, machines, or the like, 120, 122, which generate data signals of interest to the user of the microscope. By way of a non-limiting example, the machines 120, 122 can include one or more devices used in, or prior to, cataract surgery, ophthalmic anterior segment surgery, and vitreo-retinal surgery, such as: a vacuum or aspiration device; vitreous cutting device; phacoemulsification device; ultrasound device; irrigation and aspiration devices; a general purpose computing devices (having a memory readable by the computing device) having a data of interest to the surgeon; devices which display various still or moving images, such as OCT pictures, MRI images, CT scan images, x-rays images, and the like; Flourescien Angiography (FA); medical record display device; and any other data display that the user of the microscope typically is concerned with during the use of the microscope. As is well known to those of skill in the art, such devices commonly include an image output, data output, or both, by which the data or image being displayed by the machines 120, 122 is output for use by another device. In accordance with an advantageous embodiment of the present invention, the system includes an image display device driver 124 that is in communication with both the machines 120, 122, and with the display device via wired or wireless communications paths 110. The driver is configured to accept the one or more data and/or image signals from the machines 120, 122, and drive the image display device in or on the microscope 100 to project images as described herein.

Figure 3:
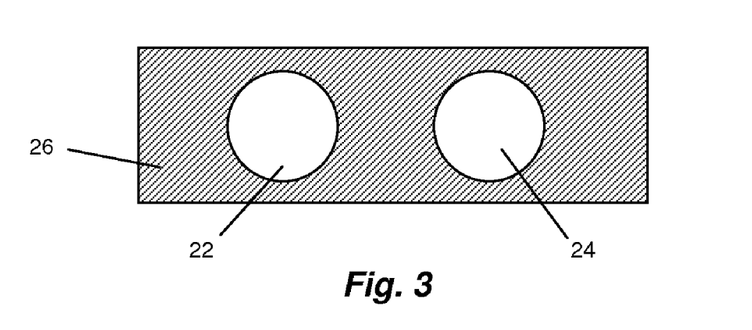
FIG. 3 schematically illustrates a portion of first exemplary embodiment of a surgical microscope in accordance with the present invention.
Figure 5:
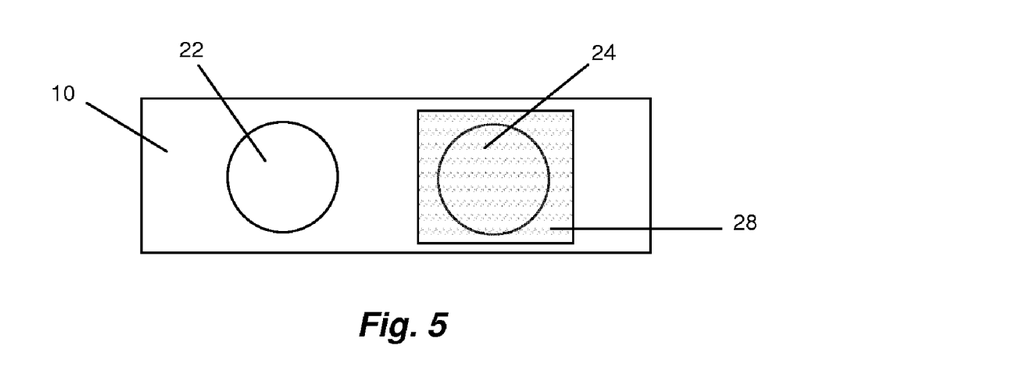
FIG. 5 schematically illustrates a portion of second exemplary embodiment of a surgical microscope in accordance with the present invention.

With reference to FIG. 3, an image display device 26 can be positioned in the eyepiece housing 104, with the left 22 and right 24 oculars extending from the position of the image display device 26. Alternatively, as illustrated in FIG. 5, an image display device 28 can be positioned immediately upstream or downstream of one or both of the oculars, 22, 24, for example, upstream or downstream of the right ocular 24. As indicated in FIG. 4, other alternative or additional positions in the microscope 100 include the head mount 112, and the C-mount 106, as well as the zoom ring, microscope housing, and/or the focus housing. According to yet another alternative embodiment, the image display device could be embedded in an external portion attachable to any of these aforementioned portions of the microscope, and the image produced fed into the microscope light-beam pathway using a system of reverse beam-splitters.

Figure 6:
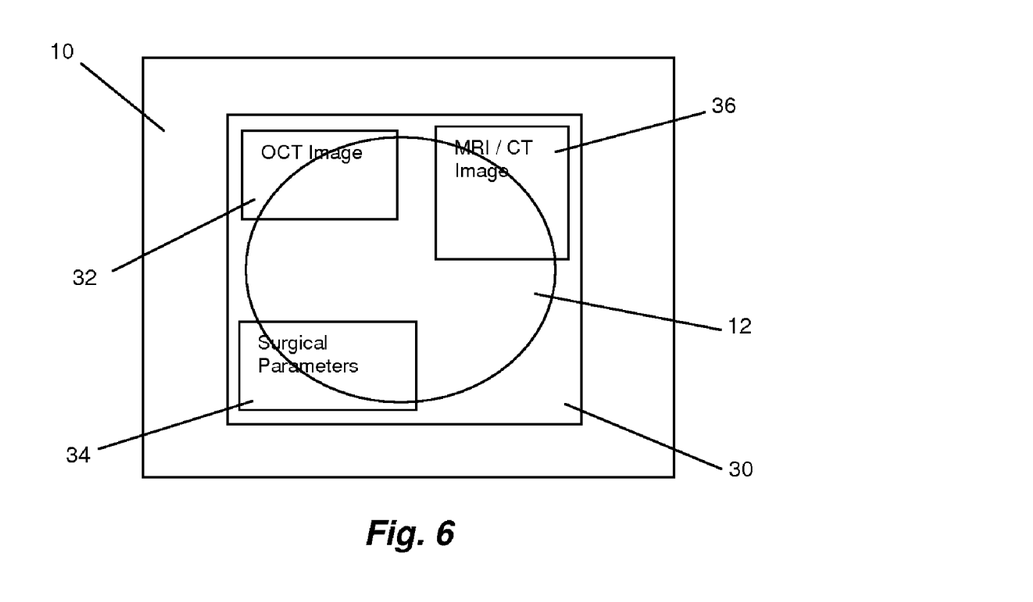
FIG. 6 schematically illustrates an exemplary view when overlaying either or both of the light pathways with an image in accordance with the present invention.
Figure 7:
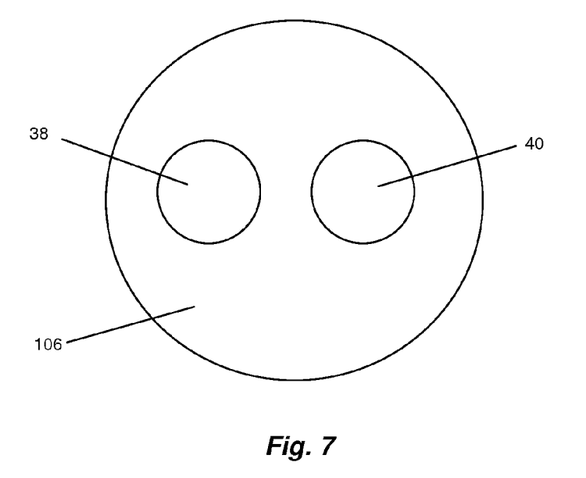
FIG. 7 schematically illustrates a C-mount portion of a surgical microscope.

In a particularly advantageous embodiment, the image display device includes a transparent or top-emitting OLED (TOLED) positioned in one or both of the light pathways coming through the microscope, rather than being positioned to project the image data only into the blackspace 10. This set of embodiments allows the user, e.g., a surgeon, to maintain his/her view of the surgical field through one eyepiece while the other eyepiece will display the data settings on a TOLED overlaying the surgical view in that light pathway. The two (left, right) images will be fused by the user to create a unified single image that displays both the surgical view (from one eyepiece) and the data view (from the other eyepiece). FIG. 5 schematically illustrates one such embodiment, and the final viewer's field (derived from the fusion of the images from eyepiece/ocular 22, eyepiece/ocular 24, and display 28) is schematically illustrated in FIG. 6. More specifically, a number of data display fields 32, 34, 36, are displayed overlapping with the image 12 of the surgical field, formed in a display area 30 from the device 28.

Figure 8:
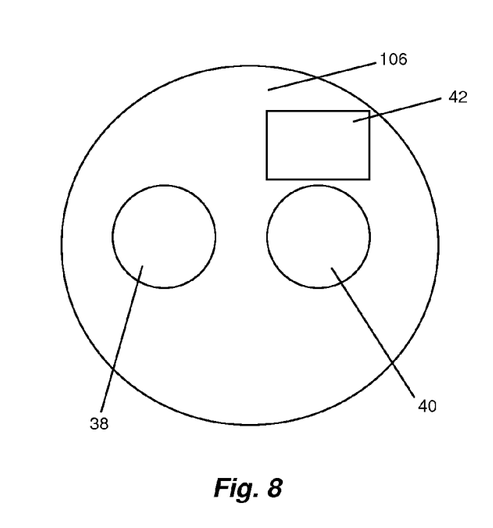
FIGS. 8 and 9 schematically illustrate C-mount portions of a third and fourth exemplary embodiments of a surgical microscope in accordance with the present invention, with display technologies of the present invention moved into disengaged positions.
Figure 9:
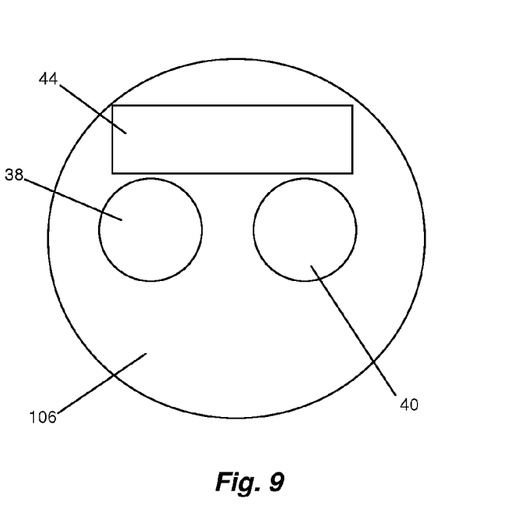
Figure 10:
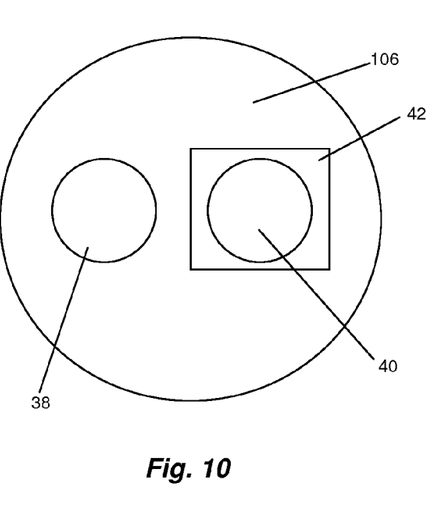
FIGS. 10 and 11 schematically illustrate the same views as FIGS. 8 and 9, respectively, but with display technologies of the present invention moved into engaged positions.
Figure 11:
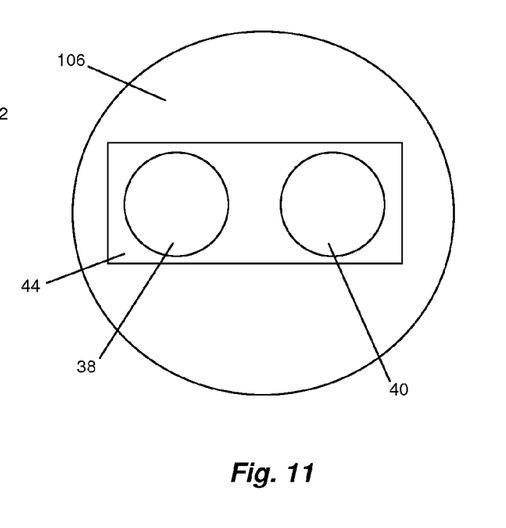

In yet another embodiment, schematically illustrated in FIGS. 7-11, the image display device, such as an OLED or other display technology, is positioned in a C-mount unit 106 into the microscope stack, which includes any area in the tube of the microscope between the oculars 102 and the end 108 in FIG. 4. The image display device(s) 42,44 is (are) positioned in one or both of the light pathway slots 38, 40. In the case of a transparent (or top-emitting) OLED, the display 42, 44 can remain in one or both of these slots, as the light pathways from the microscope field will still come through the transparent display and therefore to the operators final field of view. In the case of an opaque display, the display would minimize the light coming through to the operator's final field of view. For such opaque display devices, the user can 'disengage' the display device from the light path, in order to maximize light coming from the microscope field. According to this embodiment, the display device 42, 44 is mounted to a simple pivot, slide, or similar mechanism to move the display device 42, 44 from a 'disengaged' position (FIGS. 8, 9) to an 'engaged' position (FIGS. 10, 11). When disengaged from the engaged position, the display 42, 44 is physically moved (pivoted, slid, or the like) into an area that is outside of the light pathway slots 38, 40 as illustrated in FIGS. 8 and 9, and thereby do not obstruct the operator's final view. When moved into the engaged position illustrated in FIGS. 10 and 11, from the disengaged position, the display device 42, 44 is mechanically moved into position in one (FIG. 10) or both (FIG. 11) of the light pathway slots 38, 40. When the display device 42, 44 includes TOLEDs, then the display can remain in place in one or both of the light pathway slots and allow the light to pass through the transparent screen while data flow is off.

Figure 12:
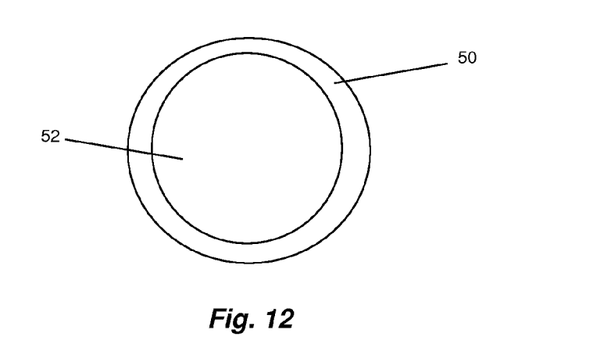
FIG. 12 schematically illustrates a portion of fifth exemplary embodiment of a surgical microscope in accordance with the present invention.

FIG. 12 illustrates (with a bottom plan view) another exemplary embodiment of a microscope, in which the display device 52, such as an OLED (or other display technology), is positioned at the terminal end 108 of the microscope before the light originating at the operative field is split from one lightpath into two. The embodiment illustrated in FIG. 12 permits one display to cover the full surgical field of view, which may be advantageous in some circumstances.

Figure 13:
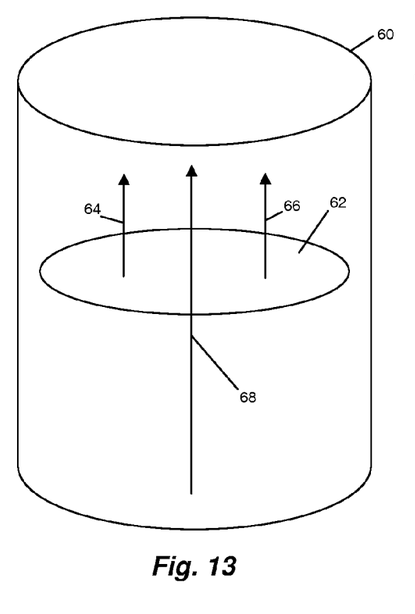
FIGS. 13 and 14 each schematically illustrate a portion of a microscope including image producing devices according to yet further embodiments of the present invention.
Figure 14:
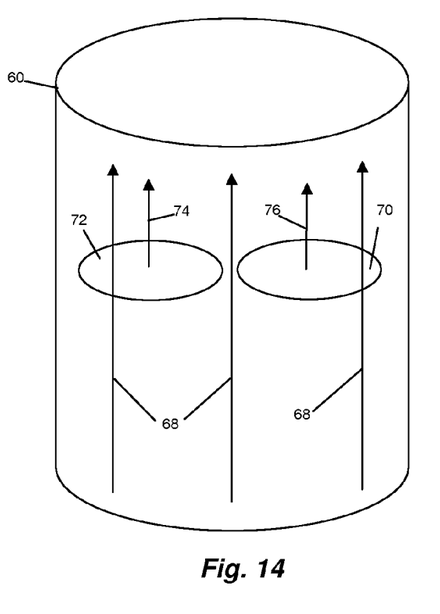

FIGS. 13 and 14 illustrate one of numerous principles of the present invention. In general terms, a portion 60 of a microscope, through which one or more light paths 68 pass, includes an image display device 62 which projects images 64, 66 of data from external sources, as described elsewhere herein. As discussed above, the portion 60 of the microscope can be any portion of the microscope through which a lightpath passes. Furthermore, as generally illustrated in FIG. 14, more than one image display device 70, 72 can be provided, each projecting images 74, 76, respectively, along a lightpath, with each device dedicated to a single light path 68, multiple devices provided for a single light path, or a single device provided for multiple light paths.

Figure 15:
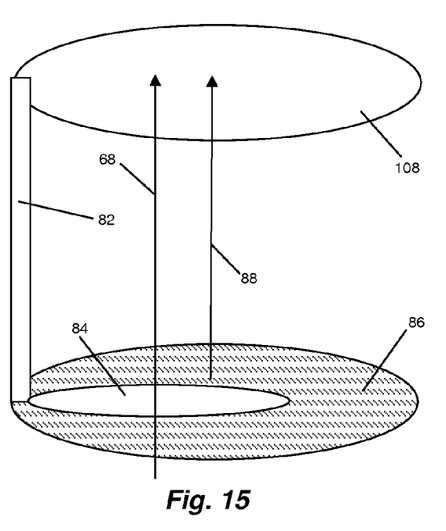
FIG. 15 schematically illustrates a sixth exemplary embodiment of a surgical microscope in accordance with the present invention.
Figure 16:
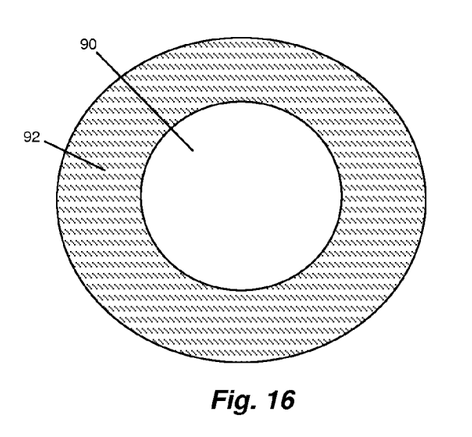
FIG. 16 illustrates a top plan view variation of the embodiment illustrated in FIG. 15.

FIGS. 15 and 16 schematically illustrate further exemplary embodiments, in which the image display device(s) 86 is (are) not positioned in the microscope stack, but is (are) external to it. By way of non-limiting example, a display 86 can be attached to a non-contact viewing system, known in the field of vitreo-retinal surgery, which includes an arm 82 that is attached to and extends downwardly from the microscope, e.g., from end 108 of the microscope, and a lens 84. Such viewing systems are commonly commercially available, for example from Oculus, Inc., and Insight Instruments (Stuart, Fla.) as a BIOM-brand device. Mounting the display 86 with the lens 84, or along the arm 82, permits the display image 88 to cover a portion of or the entire surgical field, and can be easily retrofit onto existing microscopes; the image can be offset from the center of the view of the surgical field, as suggested in FIG. 15, or the image 92 can be co-centered 92 with the viewing/surgical field 90, as illustrated (top plan view) in FIG. 16. In the embodiment illustrated in FIG. 16, data images can thus be projected into the space around the field 90, which can be an annular space as illustrated, into the field 90, or into both. Further optionally, or alternatively, the external image display device 86 can be positioned closer to the user's eyes than the oculars/eyepieces 102 (see FIG. 4), e.g., further downstream along the lightpath(s) 68 than the last optical element in the oculars. According to yet another exemplary embodiment, the display device 86 can be movably mounted to the arm 82, e.g., at a pivot point or a simple slide mechanism, permitting the user to move the display out of the viewing field and/or blackspace entirely. Further optionally, the lens 84 of the viewing system can be excluded, that is, the image display device can be mounted upstream of the end 108 of the microscope on a dedicated arm 82, without a viewing system, or in conjunction with another device external to the microscope.

Figure 17:
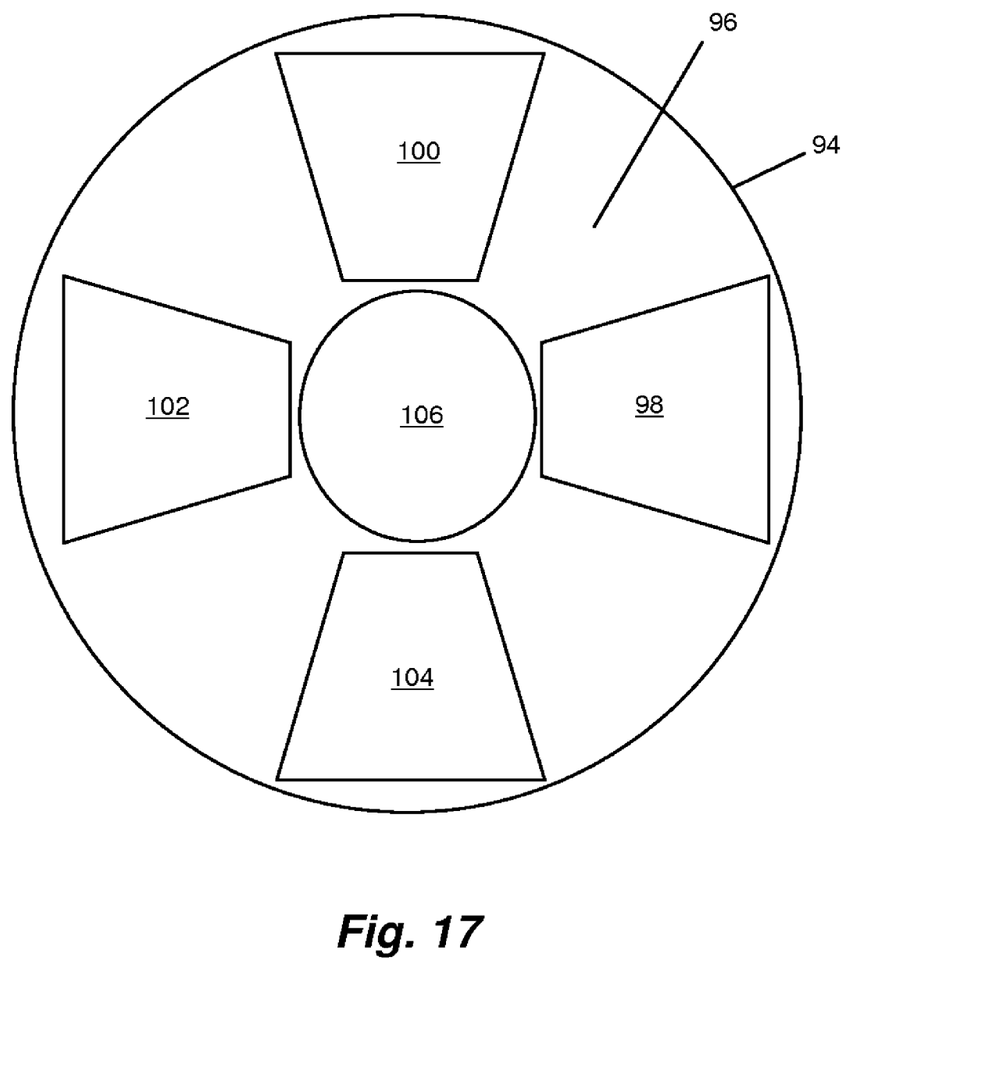
FIG. 17 illustrates a top plan view of yet another exemplary embodiment.

FIG. 17 illustrates, with exaggerated perspective, portions of yet another exemplary microscope embodying principles of the present invention. In the top plan view of FIG. 17, the microscope creates a viewing field 106 which is surrounded by a blackspace 96 which is at least partially formed by the inner surface of the structures of the microscope stack through which the one or more lightpaths extend. In this context, a microscope's viewing field is similar to a cardboard mailing tube in which posters, diploma, and the like are often housed: when looking down such a mailing tube, one sees, out the opposite end, a smaller viewing field surrounded by a blackspace formed by the internal surface of the mailing tube. In accordance with the embodiment illustrated in FIG. 17, one or more foldable image display devices 98, 100, 102, 104, such as a foldable OLED, are positioned on the inner surface 96 of one or more pieces of the stack 94 of the microscope. The images projected by the device(s) 98, 100, 102, 104 can then be seen by the user of the microscope in the blackspace 96. Particularly advantageously, the device(s) 98, 100, 102, 104 are controlled by the driver(s) so that the image(s) created are corrected for the perspective created by the view down the tube; in FIG. 17, this is represented by the trapezoidal shapes of the device(s) 98, 100, 102, 104, which are actually rectangular. While FIG. 17 illustrates four devices 98, 100, 102, 104, fewer or more can be used, with a single device, wrapped around any circumferential amount of the interior surface 96 of the piece 94, being somewhat preferred. Furthermore, the device(s) can be wrapped directly on the interior surface 96, or onto an intermediary holder or the like.

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A microscope for viewing an object external to the microscope, the microscope comprising:
   a stack of optical elements defining at least one lightpath from the object and through the stack, a viewing field, and a blackspace around the viewing field; and
   at least one image generation device positioned at least partially in the at least one lightpath and configured to project at least one image into at least one of a portion of the blackspace and a portion of the viewing field;
   wherein light passes from the object through the at least one image generating device.

2. The microscope according to claim 1, wherein the at least one image generation device is configured to project at least one image only into the blackspace.

3. The microscope according to claim 1, wherein the at least one image generation device is configured to project at least one image only into the viewing field.

4. The microscope according to claim 3, wherein the at least one image generation device comprises an OLED.

5. The microscope according to claim 1, wherein the at least one image generation device is configured to project at least one image into both the blackspace and the viewing field.

6. The microscope according to claim 1, wherein the at least one image generation device is positioned within the stack.

7. The microscope according to claim 6, wherein the stack comprises at least one of oculars, a head mount, an eyepiece mount, a C-mount, and an upstream end, and wherein the at least one image generation device is positioned in a location in the stack selected from the group consisting of immediately upsteam of the oculars, in the eyepiece mount, in the C-mount, and in the upstream end.

8. The microscope according to claim 6, wherein the at least one image generation device is movably mounted in the stack.

9. The microscope according to claim 1, wherein the at least one image generation device is positioned outside of the stack.

10. The microscope according to claim 9, further comprising:
    an arm extending from the stack, the at least one image generation device mounted to the arm.

11. The microscope according to claim 1, wherein the stack of optical elements includes an inner surface, and wherein the at least one image generation device is wrapped on or adjacent to said inner surface.

12. The microscope according to claim 1, wherein the at least one image generation device is at least partially transparent.

13. The microscope according to claim 1, wherein the at least one image generation device comprises an OLED.

14. The microscope according to claim 1, wherein the at least one image generation device comprises a TOLED.

15. The microscope according to claim 1, wherein the at least one image generation device is configured and arranged to generate at least one of static images and dynamic images.

16. The microscope according to claim 1, wherein the at least one lightpath comprises a plurality of lightpaths, and wherein the at least one image generation device is positioned to generate at least one image along at least one of the lightpaths.

17. The microscope according to claim 1, further comprising:
    a driver in signal communication with the at least one image generation device, the driver configured to receive at least one data signal from an external source and communicate at least one driver signal to the at least one image generation device based on the at least one data signal.

18. The microscope according to claim 17, further comprising:
at least one external data source in data signal communication with the driver.

19. A microscope for viewing an object external to the microscope, the microscope comprising:
a stack of optical elements defining at least one lightpath from the object and through the stack; and
at least one image generation device positioned at least partially in the at least one lightpath and external to the stack, the at least one image generation device configured to project at least one image into the lightpath;
wherein light passes from the object through the at least one image generating device.

20. The microscope according to claim 19, wherein the stack of optical elements defines a viewing field and a blackspace around the viewing field; and
wherein the at least one image generation device is configured to project at least one image into at least a portion of the viewing field.

21. The microscope according to claim 19, further comprising:
an arm extending from the stack, the at least one image generation device mounted to the arm.

22. The microscope according to claim 19, wherein the at least one image generation device is at least partially transparent.

23. The microscope according to claim 22, wherein the at least one image generation device comprises an OLED.

24. The microscope according to claim 19, wherein the at least one image generation device comprises a TOLED.

25. A method of forming an image of an object to a user of a microscope, the object being external to the microscope, the method comprising:
conducting light from the object along at least one lightpath through the microscope to define a viewing field and a blackspace around the viewing field; and
simultaneously projecting at least one image into at least one of a portion of the blackspace and a portion of the viewing field with at least one image generation device positioned at least partially in the at least one lightpath, wherein light passes from the object through the at least one image generating device.

26. A microscope for viewing an object external to the microscope, the microscope comprising:
a stack of optical elements defining at least one lightpath from the object and through the stack, a viewing field, and a blackspace around the viewing field; and
at least one image generation device positioned at least partially in the at least one lightpath and configured to project at least one image only into the blackspace.

* * * * *